May 22, 1945.	F. P. FORSS	2,376,590
NIBBLING TOOL
Filed Jan. 10, 1944	2 Sheets-Sheet 1
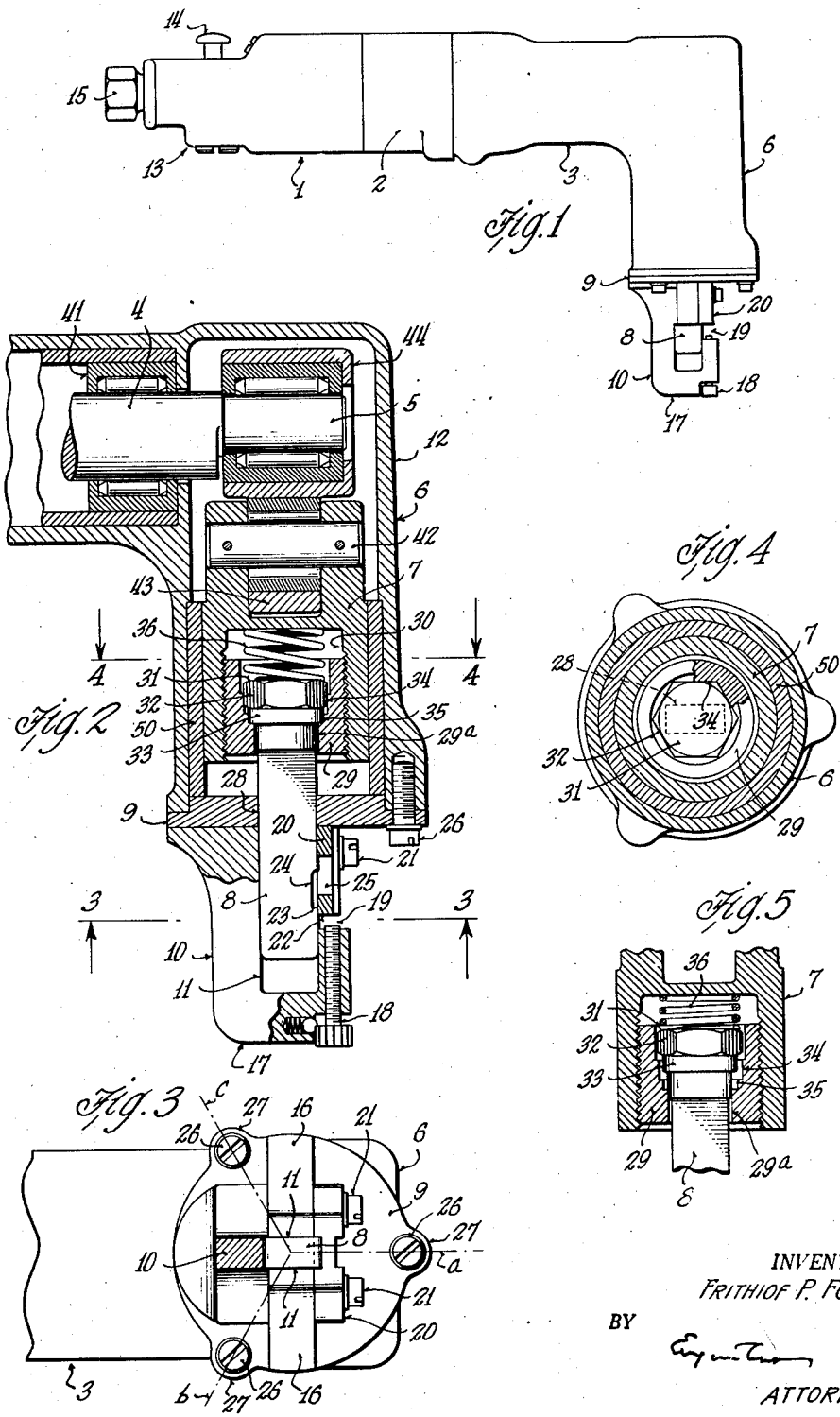
INVENTOR.
FRITHIOF P. FORSS
BY
ATTORNEY.

May 22, 1945.　　　F. P. FORSS　　　2,376,590
NIBBLING TOOL
Filed Jan. 10, 1944　　　2 Sheets-Sheet 2

INVENTOR.
FRITHIOF P. FORSS
BY
ATTORNEY.

Patented May 22, 1945

2,376,590

UNITED STATES PATENT OFFICE 2,376,590

NIBBLING TOOL

Frithiof P. Forss, Aurora, Ill., assignor to Independent Pneumatic Tool Company, Chicago, Ill., a corporation of Delaware Application January 10, 1944, Serial No. 517,678

9 Claims. (Cl. 30—228)

This invention relates to improvements in portable motor driven nibbling tools for cutting metal and like sheets.

The usefulness of electric motor driven nibblers of a size and weight small enough to be held in and operated by one hand is limited to cutting comparatively thin sheet sizes. This is due to the power limitation of the electric motor with a diameter small enough to serve as a grip for the tool.

The principal object of my invention is to provide a one hand nibbling tool with a power several times that of the present electric nibblers so that sheets as heavy as #12 gauge sheet iron can be cut.

In carrying out this object, I provide a nibbling tool with a pneumatic motor of the rotary type of a diameter small enough to serve as a grip for the tool and arrange the reciprocating drive from the motor to the plunger sufficiently strong and rugged for the increased power of the motor to cut the heaviest sheets.

A further object of my invention is to connect the cutter of the tool to the plunger by a connecter having screw threaded connection with the plunger by a thread of a relatively small pitch for axial adjustment of the cutter on turning the connecter relatively to the plunger for setting the stroke position of the cutter with a vernier-like adjustment with respect to the co-acting cutting edges on the cutter and the tool casing respectively, on assembling the tool and following regrinding the cutting edges to sharpen the same.

A further object of my invention is to connect the cutter to the connecter by interfitting means permitting selective rotative adjustment of the cutter relatively to the connecter without disturbing the axial adjustment of the connecter for turning the cutter into the adjusted positions of the die head.

A further object of my invention is to slidably and rotatably mount the cutter in the connecter for engaging and disengaging said interfitting means by the cutter and for turning the cutter for rotative adjustment when said interfitting means is disengaged.

A further object of my invention is to provide spring means acting on the cutter for normally holding said interfitting means engaged and permit disengagement thereof on moving the cutter against the spring tension.

The invention consists further in the features hereinafter described and claimed.

In the accompanying drawings—

Fig. 1 is a side elevational view of my improved nibbling tool;

Fig. 2 is a vertical sectional view with parts in elevation taken through the head section at the front end of the tool and the adjacent connected portion of the speed reducing section to show the cutter and the plunger and the reciprocating drive for the plunger;

Fig. 3 is a horizontal sectional view taken on line 3—3 of Fig. 2;

Fig. 4 is a similar sectional view taken on line 4—4 of Fig. 2, to show the interfitting connection between the cutter and the connecter;

Fig. 5 is a vertical sectional view of the connecter and cutter assembly, the cutter being shown in elevation and raised to disconnect the interfitting means for turning the cutter for rotative adjustment;

Figure 6:
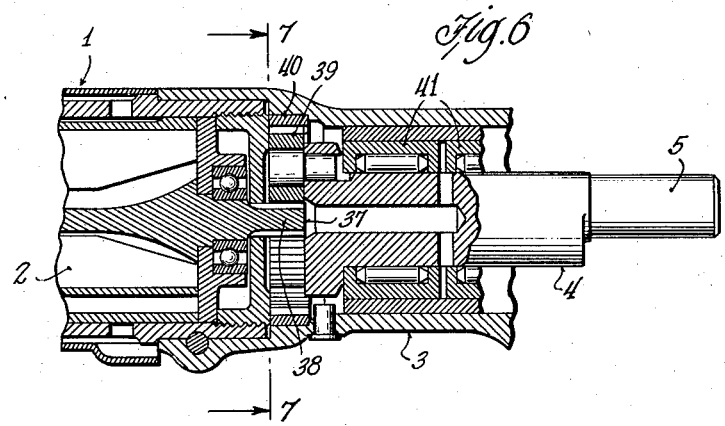
Fig. 6 is a vertical sectional view taken through the motor and the speed reducing sections wherein joined to show the adjacent portions of the motor and the drive from the motor to the shaft in the speed reducing section.

As shown in the drawings, the nibbling tool of my invention comprises a motor section 1 small enough in diameter to serve as a grip for the tool and containing a pneumatic motor of the rotary type 2, a speed reducing section 3 mounting a shaft 4 having an integral eccentric portion 5 and a head section 6 receiving said eccentric portion 5 and mounting a slidable plunger 7 to which the cutter 8 of the tool is connected. The cutter 8 extends from the head section 6 through the connected portion 9 of a die head 10 into a guideway 11 in said die head. The casing 12 of the head section 6 may be cast integral with the casing of the speed reducing section 3, and the valve section 13 at the rear end of the tool may be similarly connected with the casing of the motor section 1. The valve section 13 mounts a manually operable, spring biased, throttle valve (not shown) having an actuator 14 on the outside of the tool for controlling the supply of compressed air to the tool motor 2. A fitting 15 connects the air hose (not shown) to the air intake for the tool in the valve section 13. The tool sections 1, 3 and 13 are suitably connected together lengthwise of the tool with the head section 6 at the front end of the tool and extending laterally to one side thereof.

The die head 10 is provided with side members 16, 16 engaging the sides of the cutter 8 and a yoke 17 extending about the lower end portion of the cutter 8 and engaging its front and rear faces as shown in Figs. 1 to 3. The front leg of the yoke mounts a stripper screw 18 for supporting the sheet being cut at the throat opening 19 on the front side of the die head 10. A die or cutter plate 20 is secured by screws 21, 21 to the die head above the yoke and over the front side of the guide-way 11 as shown. This plate has a cutting edge 22 at its lower inner edge to co-act with a cutting edge 23 on the front side of the cutter 8 at the base of a relief groove 24 in the cutter and which groove connects with an opening 25 in the cutter plate 20 for the discharge of cuttings from the sheet being cut. The cutter 8 cuts on its up-stroke and the relief groove limits the feed of the sheet between the cutting edges. The plate 20 is reversible having an additional cutting edge.

Screws 26, 26 secure the die head 10 to the lower end of the head casing 12 in closing relation therewith. Said screws 26 pass through lugs 27, 27 on the die head and engage in openings in the head casing 12 as shown. The lugs 27 and the openings in the head section 6 are spaced 120 degrees apart about the cutter axis and provide for adjustment of the die head 10 into any one of three positions as indicated by the broken lines a, b and c in Fig. 3. In position a, the die head is set for a cutting action in line with the length of the tool, while in positions b or c, the die head is set for cutting operations laterally of and on either side of the tool.

The cutter 8 is of rectangular bar stock and the opening 28 in the die head 10 and its connected guide-way 11 are complementary in shape. This holds the cutter 8 from rotation in the die head.

A connector 29 screws into a chamber 30 in the plunger 7 for connecting the cutter 8 to the plunger. The chamber 30 opens through the lower end of the plunger to receive the connecter 29 and the screw threaded connection comprises a thread of relatively small pitch for a vernier-like adjustment of the cutter axially of the plunger on turning of the connecter relatively to the plunger. The connecter 29, which is circular, provides a socket to receive the head portion 31 at the upper end of the cutter 8. Said head portion 31, in the tool shown in Figs. 1 to 5, has an upper hexagonal portion 32 and a smaller, lower circular portion 33. These respective head portions 32, 33 are received within correspondingly shaped recesses 34, 35 provided in the connecter socket 29. When the parts interfit, as shown in Fig. 2, the flat co-acting faces of the hexagonal portions 32 and 34 hold the cutter 8 from rotation relatively to the connecter 29 as shown in Fig. 4. In this position of the parts, the connecter portion 33 seats in its recess 35 and a coiled, expansion spring 36 in the chamber 30 acts on the cutter 8 to normally hold the parts engaged. Pressing the cutter 8 inwardly against the tension of the spring 36 raises the hexagonal portion 32 out of the similarly shaped recess 34 and permits turning the cutter 8 relatively to the socket 29 without disturbing the axial adjustment of the latter. Fig. 5 shows the cutter 8 raised for rotative adjustment. The circular portion 33 supports the cutter for this rotative movement and the rectangular portion of the cutter extends through a circular opening 29a at the lower end of the connecter 29 to permit this turning of the cutter. Releasing the cutter 8 allows the spring tension 36 to re-seat the cutter 8 in its connecter recesses 34, 35 and the cutter is held from rotation relatively to the connecter by the interfitting flats on the hexagonal portions of the cutter and the connecter, respectively. This hexagonal arrangement provides six selective rotative positions of adjustment of the cutter with respect to the connecter 29.

Turning the connecter 29 in the plunger 7 adjusts the cutter 8 axially for setting the stroke position of the cutter with respect to the co-acting cutting edges 22, 23 on the die head 10 and the cutter, respectively. This axial adjustment may be made when assembling the tool and after regrinding the cutting edges to sharpen the same. The axial adjustment is made after the die head 10 is removed from the tool.

The rotative adjustment of the cutter 8 is made to position the cutter for entering the guide-way 11 in the die head 10 in its various positions of adjustment as provided by the spacing of the lugs. The cutter 8 is also turned to set it in operation position should an axial adjustment displace the cutter with respect to the die head. As before mentioned, this rotative adjustment of the cutter may be made without disturbing the axial adjustment of the cutter and the stroke position of the cutter is maintained. After the adjustments are made the die head 10 is replaced and secured in place by the screws 26.

The driving connection between the motor 2 and the shaft 4 in the tool section 3, in the embodiment shown, comprises a planetary gearing having a sun gear 37 on the rotor shaft 38 of the motor 2, planet pinions 39, 39 carried by a head portion of the shaft 4 at the sun gear and a ring gear 40 fixed against rotation in the tool section 3. The tool section 3 mounts roller bearings 41, 41 for the shaft 4 as shown.

The plunger 7 is connected by a pivot pin 42 with a rigid, one-piece driving rod 43 having a portion 44 about the eccentric 5 on the shaft 4 as shown in Fig. 2. The rod 43 fits within the bifurcated upper end of the plunger 7 as shown and the plunger is held from rotation in the head casing 12. The driving means shown is rugged and strong and transmits the increased power of the pneumatic motor 2 for cutting sheets as heavy as #12 gauge sheet iron as hereinbefore noted.

Figure 8:
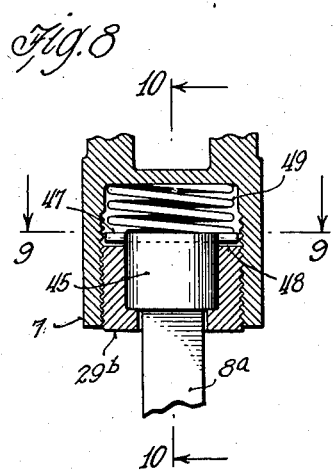
Fig. 8 is a vertical sectional view with parts in elevation showing a modified form of interfitting connection between the connecter and the cutter.
Figure 7:
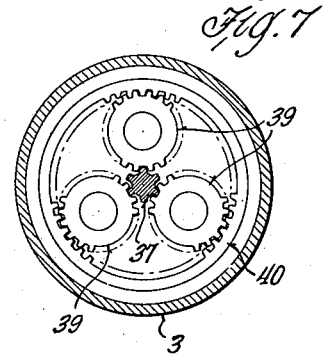
Fig. 7 is a vertical sectional view taken on line 7—7 of Fig. 6.
Figure 10:
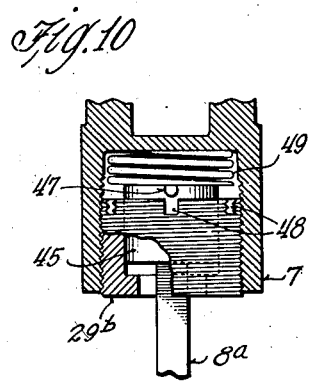
Fig. 10 is a view similar to the showing in Fig. 8, the cutter being raised to disengage the cross-pin from the peripheral slots in the connecter.
Figure 9:
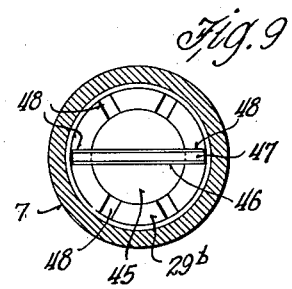
Fig. 9 is a horizontal sectional view taken on line 9—9 of Fig. 8.

A modified form of interfitting connection between the cutter and its connecter is shown in Figs. 8 to 10. Here, the cutter is marked 8a and the connecter socket is marked 29b. The cutter 8a has a head portion 45 provided with an upwardly opening cross-slot 46 to receive a cross-pin 47 which extends at its opposite ends beyond the cutter to seat in alined slots 48 spaced about the upper edge of the connecter 29b. A coiled spring 49 acts on the cutter 8a to seat the pin 47 in the selected connecter slots 48, a washer (not shown) being interposed between the spring and the pin. The pin 47 holds the cutter against rotation with respect to the connecter 29b, but on raising the cutter against the tension of the spring the cutter may be turned to engage the selected slots 48. Six slots 48 are shown to provide for a like number of adjusted positions for the cutter.

The plunger 7 is mounted in the head casing 12 in a bushing 50 clamped between the upper portion 9 of the die head and a shoulder in the tool casing 12 as shown in Fig. 2.

The nibbling tool of my invention as herein shown and described has the power necessary for cutting sheets as heavy as #12 gauge with the motor section of the tool small enough in diameter and weight to serve as a grip for holding the tool in one hand.

The details of construction and arrangement of parts shown and described may be variously changed and modified without departing from the spirit and scope of my invention, except as pointed out in the annexed claims.

I claim as my invention:

1. A cutter head of the character described comprising, a casing, a plunger reciprocably mounted therein, a cutter bar reciprocated by said plunger, a stationary member supported by the casing, said member and said cutter having co-acting cutting edges, a connecter connecting the cutter to the plunger and having screw threaded engagement therewith for axial adjustment of the cutter, said cutter having rotative connection with the connecter for rotative adjustment of the cutter relative to the connecter, interengaging means on the cutter and the connecter for holding the cutter from rotation relative to the connecter in the various positions of rotative adjustment of the cutter in the connecter, said cutter being movable endwise of the connecter for disengaging said interengaging means for releasing the cutter for rotative adjustment, and means for normally holding the interengaging means engaged.

2. A cutter head of the character described comprising, a casing, a plunger reciprocably mounted therein, a cutter bar reciprocated by said plunger, a stationary member supported by the casing, said member and said cutter having co-acting cutting edges, a connecter connecting the cutter to the plunger and having screw threaded engagement therewith for axial adjustment of the cutter, said cutter having rotative connection with the connecter for rotative adjustment of the cutter relative to the connecter, interengaging means on the cutter and the connecter for holding the cutter from rotation relative to the connecter in the various positions of rotative adjustment of the cutter in the connecter, said cutter being slidably mounted in the connecter for disengaging said interengaging means for releasing the cutter for rotative adjustment, and spring means for normally holding the cutter in the connecter and the interengaging means engaged.

3. A cutter head of the character described comprising, a casing, a plunger reciprocably mounted therein, a cutter bar reciprocated by said plunger, a stationary member supported by said casing, said member and said cutter having co-acting cutting edges, a connecter connecting the cutter to the plunger and having screw threaded engagement therewith for axial adjustment of the cutter, interfitting, non-circular, head and socket portions on the cutter and the connecter for holding the cutter from rotation relative to the connecter in the various positions of rotative adjustment of the cutter in the connecter, said cutter being slidably mounted in the connecter for disengaging the head and socket portions for releasing the cutter for rotative adjustment, and spring means acting on the cutter for normally holding said head and socket portions engaged.

4. A cutter head of the character described comprising, a casing, a plunger reciprocably mounted therein, a cutter bar reciprocated by said plunger, a stationary member supported by said casing, said member and said cutter having co-acting cutting edges, a connecter connecting the cutter to the plunger and having screw threaded engagement therewith for axial adjustment of the cutter, said cutter having rotative connection with the connecter for rotative adjustment of the cutter relative to the connecter, a cross-pin and circumferentially spaced slots therefor carried by the cutter and the connecter for holding the cutter from rotation relative to the connecter in the various positions of rotative adjustment of the cutter in the connecter, said cutter being slidably mounted in the connecter for disengaging the cross-pin from the slots for releasing the cutter for rotative adjustment, and spring means acting on the cutter for normally holding the cross-pin engaged in the slots.

5. A cutter head of the character described comprising, a casing, a plunger reciprocably mounted therein, a cutter reciprocated by said plunger, a stationary member supported by said casing, said member and said cutter having coacting cutting edges, a connector connecting the cutter to the plunger and having screw threaded engagement therewith for axial adjustment of the cutter, said cutter having rotative connection with the connecter for rotative adjustment of the cutter relative to the connecter, head and socket portions on the cutter and the connecter for seating the cutter in the connecter, said head and socket portions having engageable flat faces for holding the cutter from rotation relative to the connecter in the various positions of rotative adjustment of the cutter, said cutter being slidably mounted in the connecter for disengaging said flat faces for releasing the cutter for rotative adjustment, and spring means acting on the cutter for holding the head and socket portions engaged.

6. A cutter head of the character described comprising, a hollow casing having an open end, a plunger reciprocably mounted in said casing, a cutter bar reciprocated by said plunger, a member fixedly secured to the casing in closing relation to the open end of the casing, said member and said cutter having coacting cutting edges, a connecter connecting the cutter to the plunger, said cutter and said connecter having rotative connection with the connecter and plunger, respectively, and means for holding the cutter from rotation relative to the connecter in the various positions of rotative adjustment of the cutter, said cutter having a non-circular section and said member having a non-circular opening for passing the cutter for holding the connecter against accidental rotation relative to the plunger.

7. A cutter head of the character described comprising, a casing, a plunger reciprocably mounted therein, a cutter reciprocated by said plunger, a member fixedly supported by said casing and having a cutting edge co-acting with a cutting edge on the cutter, connecting means for connecting the cutter to the plunger and providing for rotative adjustment of the cutter relative to the connecter, releasable holding means for holding the cutter and the connecter from relative rotation in the various positions of rotative adjustment of the cutter, said holding means being disengaged for rotative adjustment of the cutter on movement of the cutter towards the plunger, and means for causing reengagement of said holding means on the outward movement of said cutter.

8. A cutter head of the character described comprising, a support, a cutter bar mounted therein, driving means in the support for imparting reciprocable movement to the cutter, said support and the cutter having co-acting cutting edges, means for connecting the cutter to the driving means and enabling rotative adjustment of the cutter relative to the connecting means, means for holding the cutter from rotation relative to the connecter in the various positions of rotative adjustment of the cutter, said cutter being slidably mounted in the connecting means for releasing the holding means for rotative adjustment of the cutter, and spring means for holding the cutter in the connecting means and the holding means engaged.

9. A cutter head of the character described comprising, a casing, a plunger reciprocably mounted therein, a cutter bar reciprocated by said plunger, a member stationarily secured to the casing and having a cutting edge co-acting with a cutting edge on the cutter, a connecter connecting the cutter to the plunger, a head portion on the cutter and a receiving socket therefor in the connecter, said socket having upper and lower communicating sections, the upper section being larger than the cutter head, the lower section of the socket fitting the cutter head and having a non-rotative connection therewith, said cutter being slidably and rotatably mounted in the connecter for rotative adjustment of the cutter relative to the connecter on sliding the cutter to locate its head portion in the larger section of the socket, and spring means for normally holding the cutter with its head portion in the lower smaller section of the socket.

FRITHIOF P. FORSS.